United States Patent
He et al.

(10) Patent No.: US 7,013,069 B1
(45) Date of Patent: Mar. 14, 2006

(54) METHOD AND APPARATUS FOR SEPARATING CHANNEL SIGNALS

(75) Inventors: Chun He, Fremont, CA (US); Yao Li, Fremont, CA (US); Andy Zhou, Fremont, CA (US)

(73) Assignee: Alliance Fiber Optic Products, Inc., Sunnyvale, CA (US)

(*) Notice: Subject to any disclaimer, the term of this patent is extended or adjusted under 35 U.S.C. 154(b) by 29 days.

(21) Appl. No.: 10/885,252

(22) Filed: Jul. 6, 2004

(51) Int. Cl.
*G02B 6/32* (2006.01)
*G02B 6/42* (2006.01)

(52) U.S. Cl. .......................... 385/47; 385/33; 385/93; 398/139

(58) Field of Classification Search ................ 385/47
See application file for complete search history.

(56) References Cited

U.S. PATENT DOCUMENTS

| | | |
|---|---|---|
| 5,546,212 A | 8/1996 | Kunikane |
| 6,181,850 B1 * | 1/2001 | Nakamura et al. ............ 385/33 |
| 6,493,121 B1 | 12/2002 | Althaus |
| 6,571,033 B1 | 5/2003 | Caracci |

* cited by examiner

*Primary Examiner*—Michelle Connelly-Cushwa
*Assistant Examiner*—Jerry T. Rahll
(74) *Attorney, Agent, or Firm*—Joe Zheng

(57) ABSTRACT

Designs of optical devices particularly useful for separating channels signals that are originally multiplexed are disclosed. In accordance with one design, an optical filter configured to reflect a particular channel signal is positioned to receive a multiplexed signal at a small incident angle so as to minimize residuals of other signals in the channel signal. To further increase isolation from the other channel signals, another filter is introduced to transmit only the reflected channel signal, the another filter has a frequency response reciprocal to that of the original optical filter. One of the key advantages, benefits and objects of the designs is to increase channel signals separation efficiency by increasing isolation among separated channel signals.

23 Claims, 8 Drawing Sheets

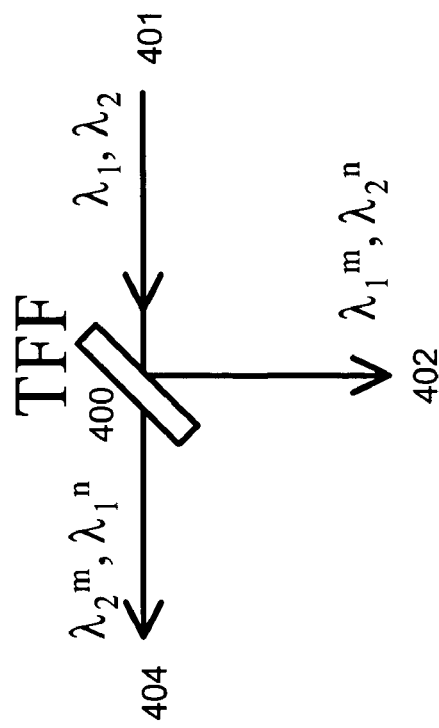

|  | Transmission | | Reflection | |
|---|---|---|---|---|
|  | Intensity | Loss (dB) | Intensity | Loss (dB) |
| 45° TFF | $\lambda_2^m = 0.91\lambda_2$, $\lambda_1^n = 0.32\lambda_1$ | $\lambda_2^m = -0.4$ $\lambda_1^n = -5$ | $\lambda_1^m = 0.68\lambda_1$, $\lambda_2^n = 0.045\lambda_2$ | $\lambda_1^m = -1.68$ $\lambda_2^n = -10.5$ |
| 0° TFF | $\lambda_2^m = 0.955\lambda_2$, $\lambda_1^n = 0.01\lambda_1$ | $\lambda_2^m = -0.2$ $\lambda_1^n = -20$ | $\lambda_1^m = 0.99\lambda_1$, $\lambda_2^n = 0.045\lambda_2$ | $\lambda_1^m = -0.04$ $\lambda_2^n = -13.5$ |

METHOD AND APPARATUS FOR SEPARATING CHANNEL SIGNALS

CROSS-REFERENCE TO RELATED APPLICATION

This application is related to U.S. patent application Ser. No. 10/600,105, filed Jun. 20, 2003, and entitled "Fiber optic collimators", which is hereby incorporated by reference.

BACKGROUND OF THE INVENTION

1. Field of the Invention

The invention is generally related to the area of optical communications. In particular, the present invention is related to apparatus for separating channel signals with high efficiency and high channel isolation and the method for making the same in compact size.

2. The Background of Related Art

The future communication networks demand ever increasing bandwidths and flexibility to different communication protocols. Fiber optic networks are becoming increasingly popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, up to 80 (and theoretically more) separate wavelengths or channels of data can be multiplexed into a light stream transmitted on a single optical fiber.

At a reception end, there needs a device to separate the multiplexed signal into individual signals. For example, in broadband applications, voice signals, data signals and video signals are often multiplexed for transmission over an optical network. When the multiplexed signal arrives in a destination (e.g., a home, a living complex or a business unit), the multiplexed signal needs to be demultiplexed to recover the voice signals, data signals and video signals for proper processing in different devices, for example, the voices signals coupled to telephones, the data signals coupled to computers, and the video signals coupled to display devices. Nevertheless, the practical applications call for devices that can efficiently separate the signals without interfering each other. There have been many efforts in designing such devices.

U.S. Pat. No. 6,493,121 describes a module referred to a transmission and reception module for bidirectional optical message and signal transmission. FIG. 1A duplicates FIG. 2A of the publication. The module composes a fiber pigtail end 0 to transmit downstream signals at wavelengths 1480 nm and 1550 nm signals and receive an upstream signal at wavelength 1300 nm. Two light sensitive components 20 and 30 are used to detect the 1480 nm and 1550 nm signals respectively, and a light emitting component 10 is used for transmitting the 1300 nm signal. To separate the 1480 nm and 1550 nm signals from the 1300 nm signal, each of two 45° oriented thin film filters (TFFs) 22 and 32 is used to couple one of the 1480 mm and 1550 nm signals to a corresponding one of the laser sensitive components 20 and 30.

In reference to FIG. 1A, FIG. 1B shows a principle functional diagram 100 of such implementation. A downstream signal 102, namely a multiplexed signal carries essentially two individual light signals at wavelength 1490 nm and 1550 nm. In the following description, wavelengths 1310 nm and 1490 nm will be used and that may correspond respectively to 1300 nm and 1480 nm used in U.S. Pat. No. 6,493,121 or similar ranges of wavelengths other places. The signal 102 is coupled from a pigtail fiber to a first thin film filter 104 that is configured to reflect a light signal at wavelength 1550 nm. When the signal 102 impinges upon the filter 104, the light signal at wavelength 1550 nm is thus redirected to a (ball) lens 106 that focuses the signal onto a laser sensitive component 108 (e.g., a photodiode). The laser sensitive component 108 converts the light signal to an electronic signal for further processing.

On the other hand, some of the signal 102 transmits through the filter 104 and essentially carries the light signal at wavelength 1490 nm. The 1490 nm signal impinges upon a second thin film filter 110 that is configured to reflect a light signal at wavelength 1490 nm. As a result, the 1490 nm signal is redirected to a (ball) lens 112 that focuses the signal onto a laser sensitive component 114 (e.g., a photodiode). The laser sensitive component 114 converts the light signal to an electronic signal for further processing.

At the same time, an upstream signal is at wavelength 1310 nm and emitted from a laser emitting device 116. The upstream signal is focused by a (ball) lens 118. As the wavelength of the upstream signal differs from the selected wavelength for the filter 104 or 110, the upstream signal thus goes through both of the filters 110 and 104 and is subsequently coupled to the pigtail fiber for transmission.

In principle, the implementation 100 works well in a bidirectional module for multichannel use to separate two or three multiplexed channel signals. However, a careful study of the implementation 100 reveals some problems in practical applications. One of the problems is the isolation between the two separated signals. It will be shown below that the separated signals interfere with each other. In other words, one signal carries a residual or a small portion of another signal. Another one of the problems is the efficiency of the separated signals. Because of the residual of one signal leaking into another, there is a loss to the signal, which can be significant when two signals are different in intensity.

It is well known that a frequency response of a thin film filter depends on an incident angle of a signal impinging upon the filter. When the incident angle is small, the frequency response of the thin film filter is maintained. When the incident angle is large, especially as large as 45° angle used in the implementation 100, the frequency response of the thin film filter is severely degraded. Noticeably, a slope region of the frequency response becomes substantially increased. The slope region, also referred to as a deadband, is the region between a stopband and a passband. In applications of separating channel signals or demultiplexing a multiplexed signal, the deadband is desirably as small as possible such that adjacent channel signals in proximity can still be cleanly separated. FIG. 2A and FIG. 2B show, respectively, two frequency responses of a thin film filter with an incident angle at 0° and 45°. The deadband in FIG. 2A for an incident angle being 0° is approximately 50 nm while the deadband in FIG. 2B for an incident angle being 45° is much greater than 150 nm (it shall be noted that the vertical scales in FIG. 2A and FIG. 2B are different).

For many fiber optic telecommunication applications, such as the fiber to the home (FTTH) application, as illustrated above, the wavelength separation between two channel signals (e.g., the 1550 nm signal and the 1490 nm signal) is often close to 50 nm. Using a uncooled laser for transmission for the purpose of reduced cost, the band separation of the two downstream signals can be as narrow as 30–40 nm. It consequently requires the deadband of a thin film filter no more than 30–50 nm. With an incident angle as large as 45°, it is very difficult to the implementation 100 to achieve a desired separation of such two channel signals. When the channel signals can not be satisfactorily separated, interferences among channel signals could take place. In the implementation 100, the 1550 nm signal and the 1490 nm signal could interfere with each other. It may be worse when a weaker signal is interfered by a small portion of a stronger signal, sufficiently enough to cause distortions or unrecoverable loss of the weaker signal.

In order to reduce the interference among channel signals, high channel signal isolation is desired. A possible improvement over the implementation 100 is to introduce a pair of block filters 120 and 122 as shown in FIG. 3. A block filter can be either an edge filter or a notch filter with transmission characteristics of allowing only the desired channel signal to pass through. Since the block filters 120 and 122 work at nearly 0° incident angle, they can effectively block or isolate other unwanted signals. For example, the block filter 120 has transmission spectral characteristics of passing only the 1550 nm signal and blocking the 1490 nm signal and others. Conversely, the block filter 122 has transmission spectral characteristics of passing only the 1490 nm signal and blocking the 1550 nm signal and others.

Although, the introduction of the blocking filters 120 and 122 can improve the isolation between channel signals, it cannot improve the signal losses caused by the original poor isolation from the filters 104 and 110 (or TFF-1 and TFF-2 of FIG. 3). After the filters 104 or 110, the corresponding reflected signal has incurred certain loss, the addition of the blocking filter 120 or 122 can only isolate the reflected signal from others and may introduce some extra loss to the signal. For some signals, a loss beyond certain percentages to its intensity could damage the signal significantly.

FIG. 4A shows some notations about a thin film filter 400 with an incident angle at 45°. The thin film filter 400 may correspond to the filter 104 or 110 in FIG. 1B or TFF-1 and TFF-2 of FIG. 3. It is assumed that a multiplexed signal 401 includes two channel signals at two different wavelengths $\lambda_1$ and $\lambda_2$. To simplify the description, the two channel signals are simply expressed as $\lambda_1$ and $\lambda_2$. The multiplexed signal is coupled to the filter 400 which is configured to reflect $\lambda_1$ and transmit $\lambda_2$. Because the frequency response of the filter 400 depends on the incident angle of the signal, at 45°, the reflected signal 402 contains not only the $\lambda_1$ signal but also some portion of the $\lambda_2$ signal.

For better understanding, a notation $I_x^y$ is used, wherein I means intensity, x indicates a wavelength and y is either "m" or "n", indicating "majority" or "minority". Thus the reflected signal 402 may be expressed as $I_{\lambda_1}^m + I_{\lambda_2}^n$, which means it includes a majority of the $\lambda_1$ signal and a minority or small amount of the $\lambda_2$ signal. Similarly, the transmitted signal 404 contains not only the $\lambda_2$ signal but also a small amount of the $\lambda_1$ signal and may be expressed as $I_{\lambda_1 n} + I_{\lambda_2}^m$. If it is assumed that the filter has an negligible absorption, then the following expressions can be true:

$$I_{\lambda_1}^m + I_{\lambda_1}^n = I_{\lambda_1} \text{ and } I_{\lambda_2}^m + I_{\lambda_2}^n = I_{\lambda_2}.$$

where $I_{\lambda_1}$ means the total intensity of the $\lambda_1$ signal, and $I_{\lambda_2}$ means the total intensity of the $\lambda_2$ signal.

In reference to FIG. 2A and FIG. 2B, the relative intensities of the $\lambda_1$ signal and the $\lambda_2$ signal in the transmitted signal 404 and the reflected signal 402 are listed in a table 450 shown in FIG. 4B. It may be observed from the table 450 that shows comparisons between incident angles 0° and 45°, nearly 91% of the $\lambda_2$ signal transmits through the filter 400 at 45° while nearly 95.5% of the $\lambda_2$ signal transmits through the filter 400 at 0°. However, the reflected signal includes only 68% of the $\lambda_1$ signal reflected by the filter 400 at 45° while the reflected signal includes 99% of the $\lambda_2$ signal reflected by the filter 400 at 0°. The signal loss evidently is much higher at 45° than at 0°.

In conclusion, the problems in the implementation 100 can be significant in some applications. Accordingly, there is a great need for techniques for an optical module that separate channel signals with high efficiency and high channel isolation. The devices so designed are amenable to small footprint, broad operating wavelength range, enhanced impact performance, lower cost, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical modules or devices, particularly for separating channels signals that are originally multiplexed. Depending on an application, a channel signal may be a pure signal at one wavelength or a group of channels or signals at a group of wavelengths. For simplicity, a group of selected wavelengths or channels will be deemed or described herein as a selected wavelength hereinafter.

According to one aspect of the present invention, a new type of collimator is designed to cause an incident light beam to be projected onto a lens at a small incident angle such that a reflected or returning light beam does not collide with the incident light beam in the lens. In other words, there two optical paths in the lens that are narrowly separated, which requires a pointing angle of the collimator be controlled within a tolerable range. The collimator includes a dual-fiber pigtail and an optical lens. Different from the prior art collimators in which two facets of a fiber and a lens are congruent with respect to an optical axis, the corresponding facets of the pigtail and the optical lens are not congruent with respect to an optical axis. In one embodiment, the facet of the pigtail is made slightly slanted while the facet of the lens is made non-slanted with respect to an optical axis such that an error in the pointing angle observed in the prior art collimators is eliminated or minimized.

According to another aspect of the present invention, an optical lens having a non-slanted facet to receive a multiplexed signal at a small incident angle, the multiplexed signal including at least a signal at wavelength λ1 (hereinafter "the λ1 signal") and another signal at wavelength λ2 (hereinafter "the λ2 signal"). A first filter is positioned before the lens and is configured to reflect only the λ1 signal and transmit signals at wavelengths other than wavelength λ1. The lens collimates the multiplexed signal onto the first filter at a small incident angle from a first optical path therein, thus the λ1 signal is reflected from the first filter and propagates along a second optical path in the optical lens. The small incident angle is generally not greater than 4°. As a result, the λ1 signal and the λ2 signal are separated, and more importantly, the λ1 signal is isolated from the λ2 signal by minimizing any residual of the λ2 signal in the λ1 signal.

According to still another aspect of the present invention, a third filter attached to a facet of the lens or the second fiber, and only in the optical path of the reflected signal from the first filter 506 to block any portion of the λ2 signal that may have been reflected by the first filter, wherein the third filter has a frequency response reciprocal to that of the first filter.

The present invention may be implemented as a module, a device, a part of a subsystem and a method for making the same. One of the objects, features, advantages of the present invention is to provide techniques for separating channel signals with high efficiency and high isolation between the channel signals. The devices so designed are amenable to small footprint, broad operating wavelength range, enhanced impact performance, lower cost, and easier manufacturing process.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 4A shows some notations about a thin film filter with an incident angle at 45°;

FIG. 4B is table showing relative intensities of the $\lambda_1$ signal and the $\lambda_2$ signal in a transmitted signal and a reflected signal in reference to the notations of FIG. 4A;

DETAILED DESCRIPTION OF THE PREFERRED EMBODIMENT

The present invention pertains to new designs of optical devices particularly useful for separating channels signals that are originally multiplexed. In accordance with the present invention, an optical filter configured to reflect a particular channel signal is positioned to receive a multiplexed signal at a small incident angle so as to minimize residuals of other channel signals in the channel signal. To further increase isolation from the other channel signals, another filter is introduced to transmit only the reflected channel signal, the another filter has a frequency response reciprocal to that of the original optical filter. One of the key advantages, benefits and objects is to increase channel signals separation efficiency by increasing isolation among separated channel signals. The present invention can be advantageously used in communications, particularly in fiber-to-home applications.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1A:
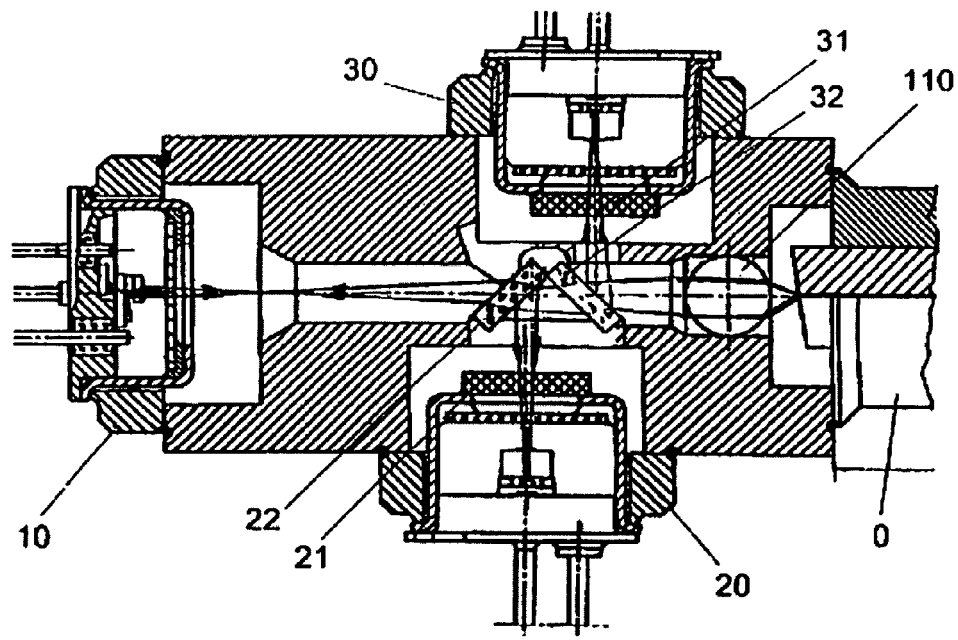
FIG. 1A duplicates FIG. 2A of U.S. Pat. No. 6,493,121 describing a module referred to a transmission and reception module for bidirectional optical message and signal transmission.
Figure 1B:
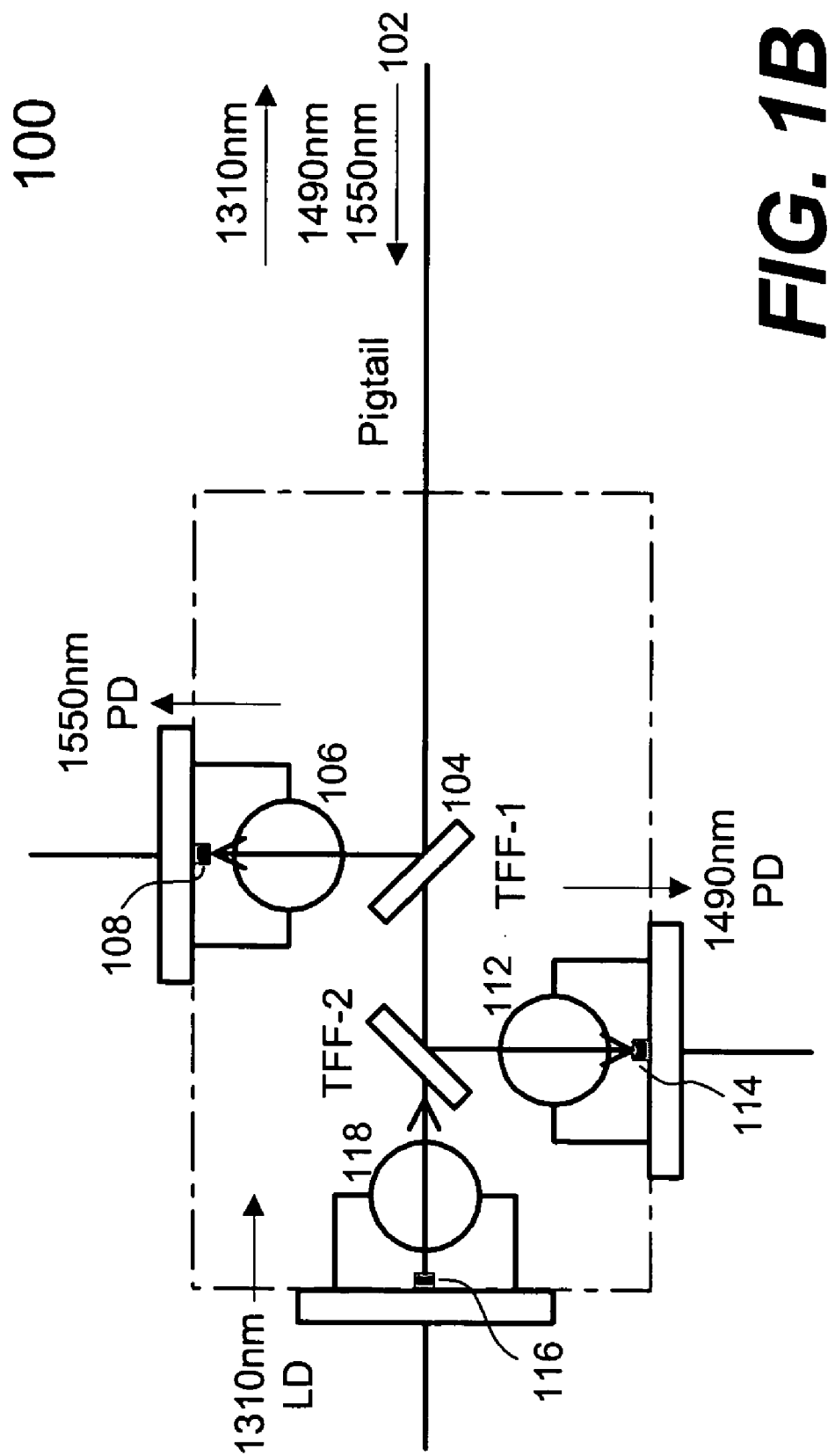
FIG. 1B shows a principle functional diagram of FIG. 1A.
Figure 2B:
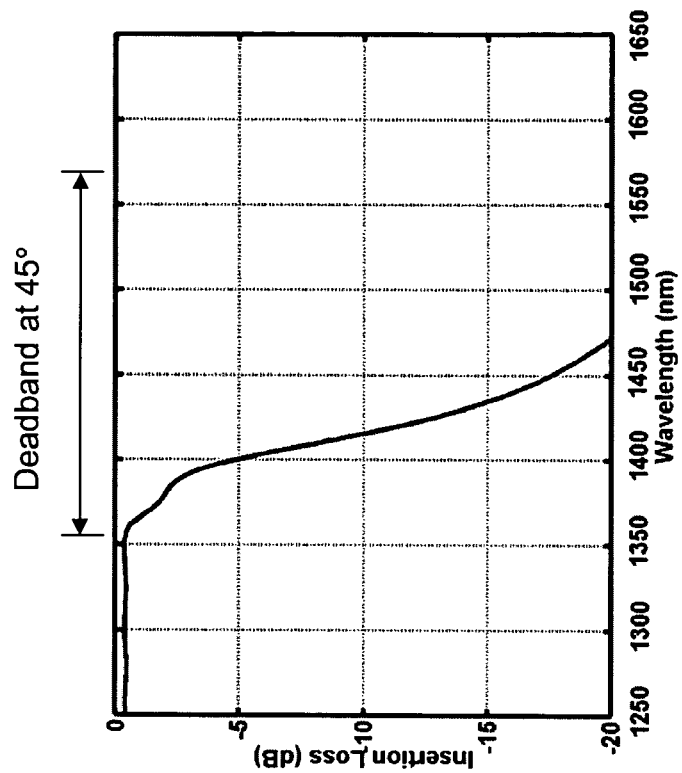
FIG. 2A and FIG. 2B show, respectively, two frequency responses of a thin film filter with at incident angle at 0° and 45°.
Figure 2A:
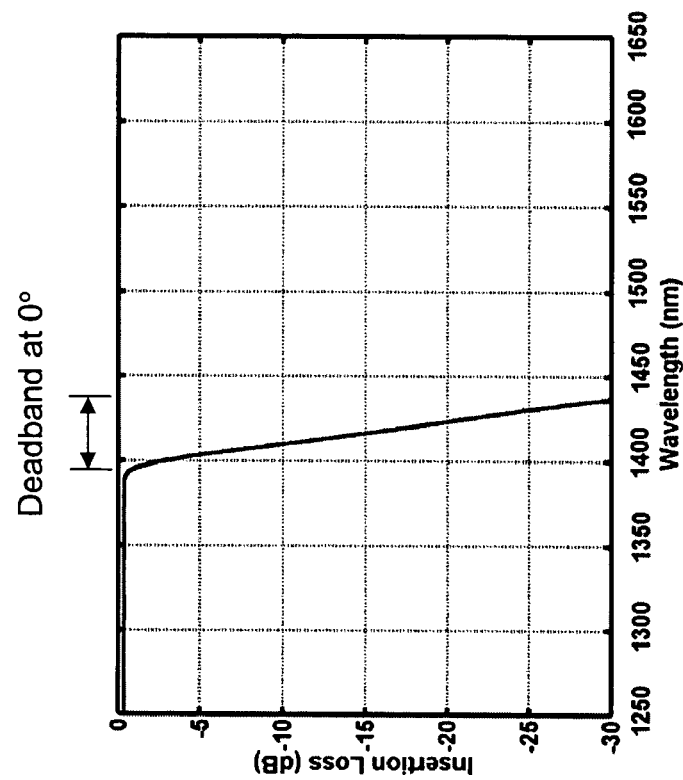
Figure 3:
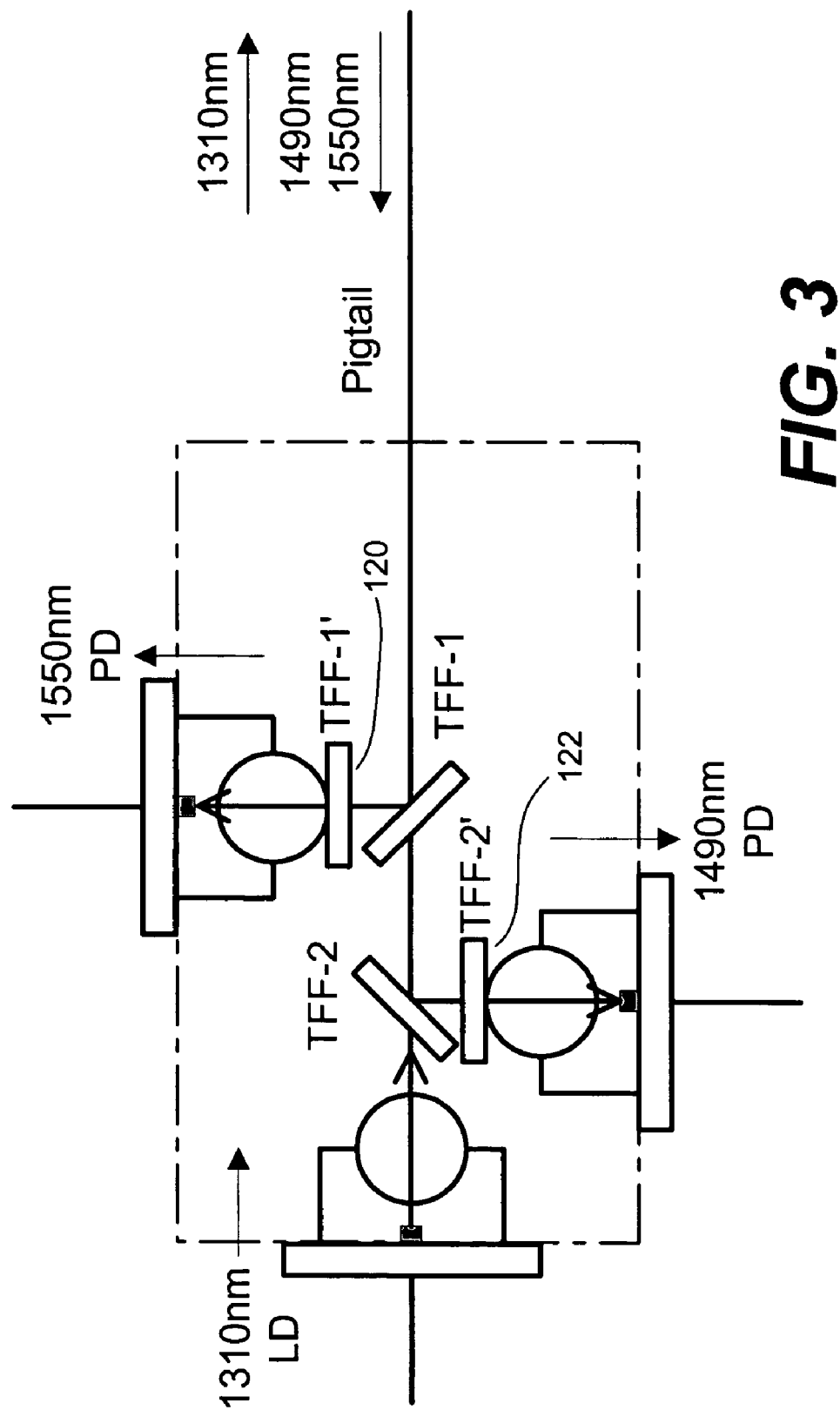
FIG. 3 shows a possible improvement over the implementation of FIG. 1B.
Figure 5:
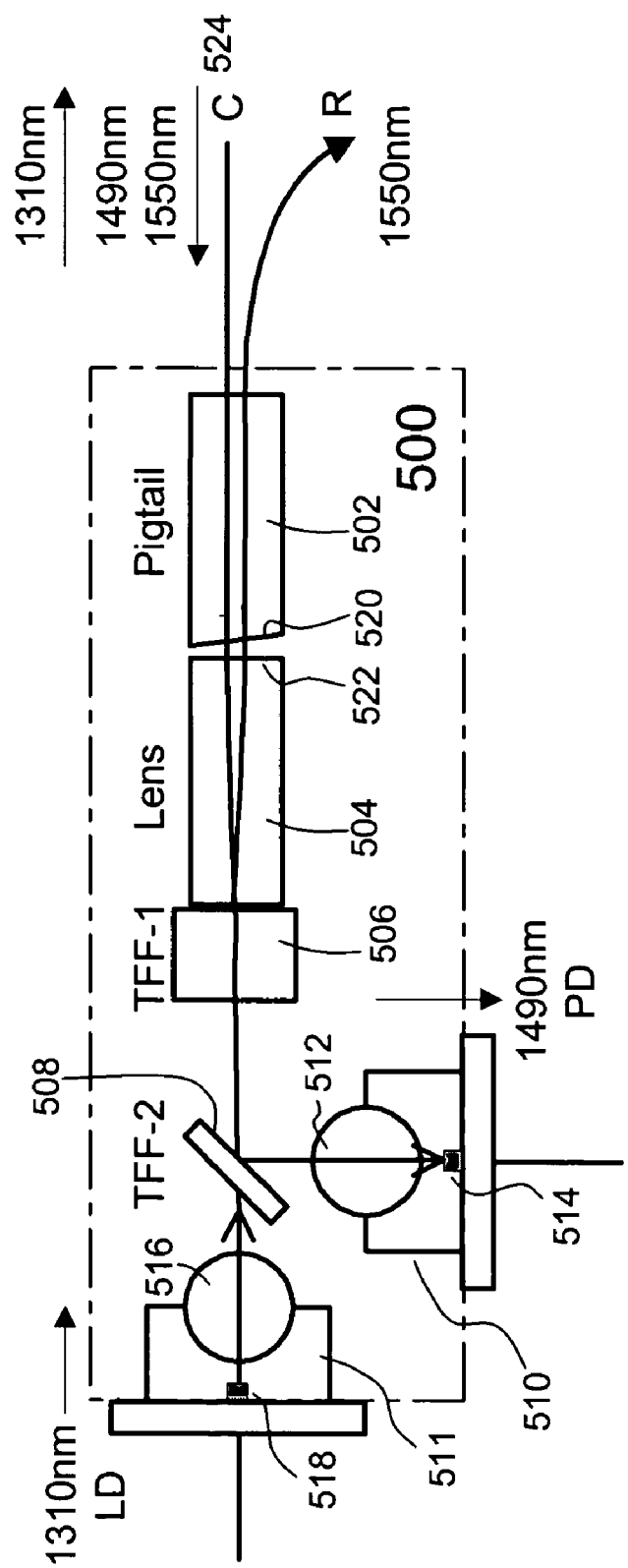
FIG. 5 shows an exemplary design according to one embodiment of the present invention.

Referring now to the drawings, in which like numerals refer to like parts throughout the several views. FIG. 5A shows an exemplary design 500 according to one embodiment of the present invention. The design 500 overcomes the problems experienced in the prior art designs, such as that shown in FIG. 1A, FIG. 1B and FIG. 3. One of the optical filters used in the design 500 is so positioned that it receives a multiplexed signal projected at a small incident angle, typically no greater than 4°. As a result, the deadband of the frequency response of the filter is within a tolerable range to sufficiently separate and isolate a selected channel signal from the rest of signals in the multiplexed signal.

The design 500 includes a dual fiber pigtail 502, an optical lens (e.g., a GRIN lens), a first optical filter 506 (e.g., a thin film filter), a second optical filter 508 (e.g., a thin film filter), and a set of light-to-electric converter 510 and a set of electric-to-light converter 511. Each of the converters 510 and 511 includes a lens 512 or 516 and a photodiode 514 or a laser diode 518. To avoid back reflection, a facet 520 of the pigtail 502 is slanted such that a light beam coming out from one of the fiber cores in the pigtail 502 will not be reflected back to the original optical path in the pigtail 502. Typically, the slanted angle θ=8° for the facet 520 of the pigtail 502 is widely adopted, but the angle is not always confined to 8° depending on an exact implementation.

The lens 504, however, has a facet 522 that is perpendicular to the optical axis of the lens, or the norm of the facet 522 is parallel to the optical axis of the lens. A light beam from the pigtail 502 is projected onto the facet 522 of the lens 504 at a small incident angle and propagates along a first optical path in the lens 504 till the light beam reaches the filter 506. The filter 506 is made, designed or configured to reflect a selected channel or wavelength signal. The reflected signal from the filter 506 back propagates along a second optical path in the lens 504. It can be appreciated that the first optical path and the second optical path can not coincide because of the small incident angle.

In operation, a multiplexed signal 524, assuming to carry three (3) signals at three different wavelengths λ1, λ2, and λ3. In the fiber-to-home applications, there are typically two or three light signals at wavelengths 1310 nm, 1490 nm and 1550 nm multiplexed for transmission to a destination. In general, the 1490 nm signal carries distributed data/voice signal and the 1550 nm carries distributed video signal, both the 1490 nm signal and the 1550 nm signal are multiplexed for transmission, while the 1310 nm signal carries data/voice signal that is transmitted at opposite direction to that of the 1490 nm and 1550 nm signals in full duplex mode. At a certain point, the 1490 nm signal and the 1550 nm signal shall be separated without interference to each other or to the 1310 nm signal and with minimum loss to each of the signals.

Figure 6:
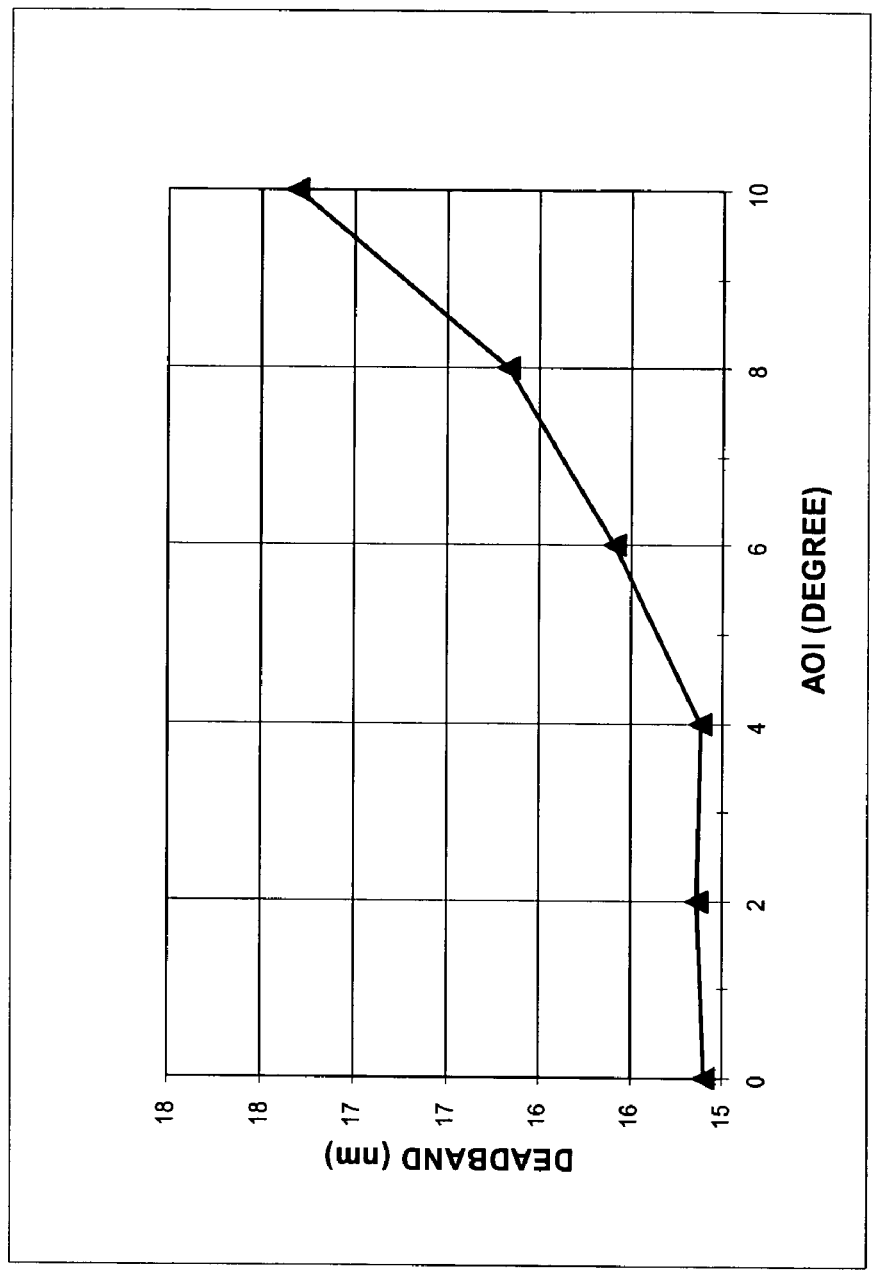
FIG. 6 shows a deadband of a thin film filter versus an incident angle.

The multiplexed signal 524 is coupled by one of the two cores in the pigtail 502 onto the lens 504 with a small angle. The multiplexed signal 524 is then collimated by the lens 504 onto the filter with a small incident angle that is substantially close to the small angle. In other words, the small incident angle on the filter 506 is realized by projecting an incident light beam via the dual fiber pigtail 502 and the lens 504, since the two fiber cores in the pigtail 502 are located at proximity distance, for example, 125 $\mu$m–300 $\mu$m. The small incident angle is determined by the effective focal length of the lens 504, which is typically ~2 mm, resulting in a small incident angle of ~1.8°–4°. At such small incident angle, measurements have shown that the deadband between the 1490 nm and 1550 nm signals can be as small as 40–50 nm, with 40–50 dB isolation of the 1490 nm signal from the 1550 nm signal. FIG. 6 shows an exemplary measurement that the deadband does not start to increase until an angle of incidence (AOL) increases beyond 4°.

The filter 506 is configured to reflect one of the three wavelengths, for example, $\lambda 1$. As a result, the $\lambda 1$ signal is reflected back to the lens 504. Since the multiplexed signal 524 is projected onto the lens 504 with a small incident angle, the reflected $\lambda 1$ signal goes off the optical path for the incoming signal 524 and is coupled to the second fiber core in the pigtail 502 to output the $\lambda 1$ signal. What is important here is that the incident angle to the filter 506 is so small that the reflection efficiency is nearly 100% (~99% from the table in FIG. 4B).

At the same time, the transmitted signal from the lens 504 now includes wavelengths $\lambda 2$ and $\lambda 3$. In the fiber-to-home applications, the signals at these frequency ranges are typically separated by a fairly large gap (for example, more than 100 nm in the fiber to home applications). In other words, the dead band can be as large as 100 nm, so even the 45° positioned 508 can give enough isolation. In addition, the data/voice signals are transmitted in digital format. For digital data, a certain loss to the intensity of the signal is typically acceptable. Accordingly, a part of the prior art design remains. A second filter 508 configured to transmit a wavelength $\lambda 2$ is positioned at nearly 45°. When the transmitted signal impinges upon the filter 508, the $\lambda 2$ signal is reflected to a light-to-electric converter 510 that includes a lens 512 to focus the $\lambda 2$ signal onto a photodiode 514.

At the same time, the electric-to-light converter 511 converts an electronic signal to a light beam at a wavelength $\lambda 3$. The light beam can pass through the filters 508 and 506 for transmission over a network.

Figure 7:
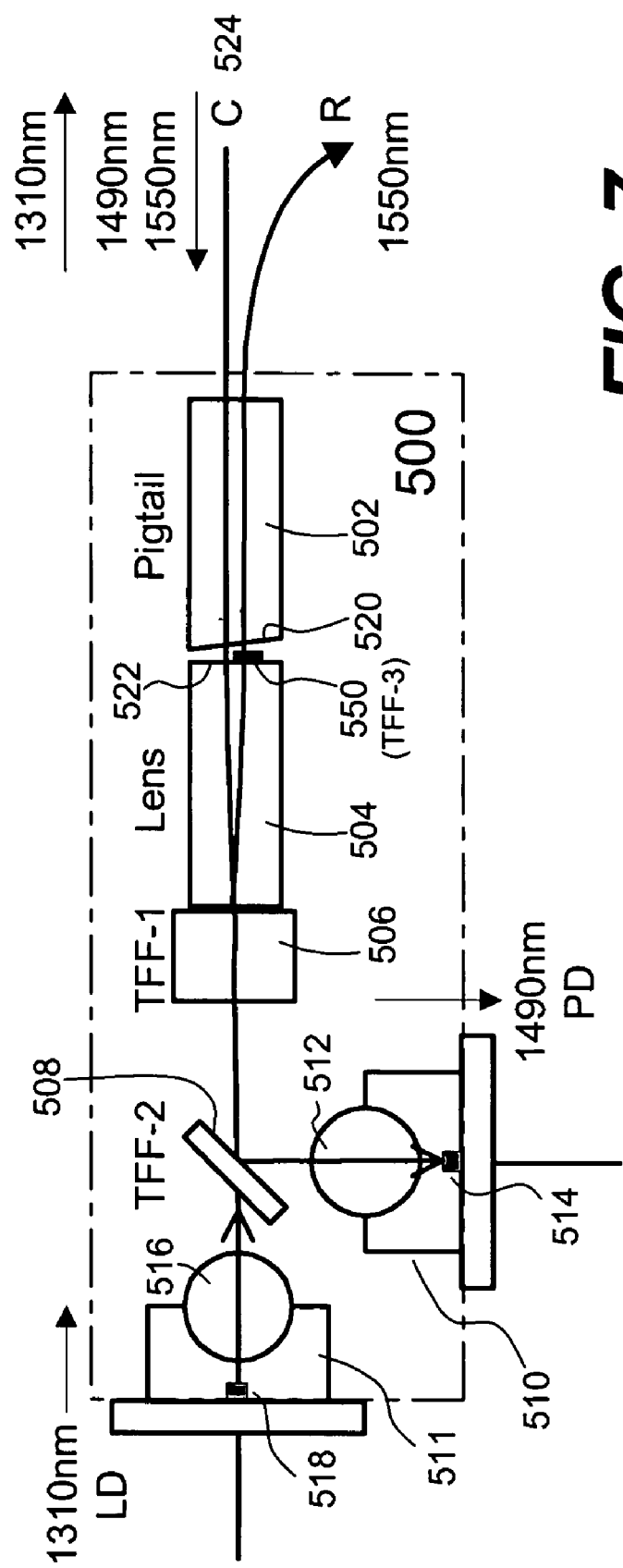
FIG. 7 shows another exemplary design according to one embodiment of the present invention.

To further improve the isolation of the $\lambda 1$ from the $\lambda 2$ (e.g., the 1550 nm signal from the 1490 nm signal isolated), FIG. 7 shows another implementation 700 in accordance with one embodiment of the present invention. The design 700 is nearly same as that in FIG. 5 except that another filter 550 (TFF-3) is deposed at either the facet 522 of the lens 504 or the dual fiber pigtail 502 that can intercept the reflected 1550 nm signal reflected from the filter. The spectral response of the filter 550 is the reciprocal of that of the filter 506, or the conjugate of the filter 506. In other words, the filter 550 transmits what the filter 506 reflects. In this case, only the $\lambda 1$ signal can pass through the filter 550, thus further isolated from the $\lambda 2$ signal.

In this exemplary configuration shown in FIG. 7, the isolation of the 1550 nm signal from the 1490 nm signal can both achieve 40–50 dB with a deadband as small as 20–25 nm, which is significant in many applications. In the fiber-to-home applications, the 1550 nm signal carries analog signals and the intensity thereof is much higher than that of the 1490 nm signal carrying digital signals. When a residual of one signal is mixed into another signal, a separated channel signal, either the 1490 nm signal or the 1550 nm signal, may be significantly distorted or unrecoverable.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. An optical module for separating channel signals with high isolation, the optical module comprising;
    an optical lens having a facet to receive a multiplexed input signal at a small incident angle, the multiplexed signal including at least a signal at wavelength $\lambda 1$ (hereinafter "the $\lambda 1$ signal") and another signal at wavelength $\lambda 2$ (hereinafter "the $\lambda 2$ signal");
    a first filter configured to reflect only the $\lambda 1$ signal and transmit signals at wavelengths other than wavelength $\lambda 1$, the optical lens collimating the multiplexed signal onto the first filter at a small incident angle from a first optical path therein, the $\lambda 1$ signal reflected from the first filter propagating along a second optical path in the optical lens, wherein the facet of the optical lens is oriented non-congruently with a corresponding facet of the first filter with respect to an optical axis of the optical lens, and a second filter, configured to reflect only the $\lambda 2$ signal and transmit signals at wavelengths other than wavelength $\lambda 2$, receiving the signals at wavelengths other than wavelength $\lambda 1$ from the first filter, the second filter reflecting the $\lambda 2$ signal therein to a designated device and transmitting remaining signals at wavelengths other than wavelength $\lambda 2$,
    wherein the $\lambda 1$ signal and the $\lambda 2$ signal are highly isolated from each other by the small incident angle to the first filter, and a frequency response of the first filter depends on an incident angle thereto;
    a dual fiber pigtail including a first fiber core to couple the multiplexed signal to the optical lens and a second fiber core to receive the $\lambda 1$ signal from the second optical path; and
    a third filter attached to a facet of the second fiber core to block any portion of the $\lambda 2$ signal that may have been reflected by the first filter, wherein the third filter has a frequency response reciprocal to that of the first filter.

2. The optical module of claim 1, wherein signals at wavelengths other than $\lambda 1$ and $\lambda 2$ transmit at opposite direction to that of the $\lambda 1$ and $\lambda 2$ signals through the first filter and the second filter.

3. The optical module of claim 2, wherein at least one of the signals is produced from an electric-to-laser converter that includes a lens and a laser diode.

4. The optical module of claim 1, wherein an intensity of the $\lambda 1$ signal is substantially stronger than that of the $\lambda 2$ signal.

5. The optical module of claim 4, wherein a small portion of the $\lambda 1$ signal, if passing through the first filter, can cause unrecoverable errors to the $\lambda 2$ signal.

6. The optical module of claim 1, wherein the $\lambda 1$ signal is much more sensitive to errors than the $\lambda 2$ signal, a small portion of the $\lambda 2$ signal, if reflected by the first filter, can cause distortions to the $\lambda 1$ signal.

7. The optical module of claim 6, wherein the λ1 signal pertains to either an analog video signal or a digital video signal, and the λ2 signal generally pertains to a digital signal.

8. The optical module of claim 7, wherein λ1 is in a range close to 1550 nm, and λ2 is in a range close to 1490 nm.

9. The optical module of claim 1, wherein the small incident angle is generally no greater than 4°.

10. The optical module of claim 1, wherein the second filter is oriented at a large incident angle that is considerably dose to 45° with respect to the incoming signals at wavelengths other than wavelength λ1 from the first filter.

11. The optical module of claim 1, wherein the third filter is attached to a portion of a non-slanted facet of the optical lens to block any portion of the λ2 signal that may have been reflected by the first filter.

12. The optical module of claim 11, wherein one or more of the first filter, the second filter and the third filter is a thin film filter.

13. The optical module of claim 12, wherein the optical lens is a GRIN lens.

14. The optical module of claim 12, wherein the dual fiber pigtail and the optical lens form a collimator with minimum pointing error.

15. The optical module of claim 1, wherein the designated device is a laser-to-electric converter that includes a lens and a photodiode, the lens focusing the λ2 signal onto the photodiode to generate a corresponding electronic signal.

16. A method for separating channel signals with high isolation, the method comprising:
    projecting a multiplexed signal from an optical lens at a small incident angle from a first optical path therein to a first filter, the multiplexed signal including at least a signal at wavelength λ1 (hereinafter "the λ1 signal") and another signal at wavelength λ2 (hereinafter "the λ2 signal"), the first filter configured to reflect only the λ1 signal and transmit signals at wavelengths other than wavelength λ1, as a result, the λ1 signal reflected from the first filter propagating along a second optical path in the optical lens;
    providing a second filter that is configured to reflect only the λ2 signal and transmit signals at wavelengths other than wavelength λ2, the second filter receiving the signals at wavelengths other than wavelength λ1 from the first filter, the second filter reflecting the λ2 signal therein to a designated device and transmitting remaining signals at wavelengths other than wavelength λ2, wherein the λ1 signal and the λ2 signal are highly isolated from each other by the small incident angle to the first filter, and a frequency response of the first filter depends on an incident angle thereto; and
    attaching a third filter to a portion of a non-slanted facet of the optical lens to block any portion of the λ2 signal that may have been reflected by the first filter, wherein the third filter has a frequency response reciprocal to that of the first filter.

17. The method of claim 16, wherein the designated device is a laser-to-electric converter that includes a lens and a photodiode, the lens focusing the λ2 signal onto the photodiode to generate a corresponding electronic signal.

18. The method of claim 16, wherein signals at wavelengths other than λ1 and λ2 transmit at opposite direction to that of the λ1 and λ2 signals through the first filter and the second filter.

19. The method of claim 16, wherein the projecting of the multiplexed signal from the optical lens comprises providing a dual fiber pigtail that includes a first fiber core to couple the multiplexed signal to the optical lens and a second fiber core to receive the λ1 signal from the second optical path.

20. The method of claim 16, further comprising attaching a third filter to a facet of the second fiber core to block any portion of the λ2 signal that may have been reflected by the first filter, wherein the third filter has a frequency response reciprocal to that of the first filter.

21. The method of claim 16, wherein the second filter is oriented at considerably close to 45° with respect to the incoming signals at wavelengths other than wavelength λ1 from the first filter.

22. The method of claim 16, wherein one or more of the first filter, the second filter and the third filter is a thin film filter.

23. The method of claim 22, wherein the optical lens is a GRIN lens.

* * * * *